United States Patent [19]

Vogt

[11] Patent Number: 4,658,249

[45] Date of Patent: Apr. 14, 1987

[54] DATA COMMUNICATION SYSTEM WITH KEY DATA BIT DENOTING SIGNIFICANCE OF OTHER DATA BITS

[75] Inventor: William R. Vogt, Rockaway, N.J.

[73] Assignee: Baker Industries, Inc., Parsippany, N.J.

[21] Appl. No.: 716,799

[22] Filed: Mar. 27, 1985

[51] Int. Cl.[4] .............................................. H04Q 9/00
[52] U.S. Cl. ........................... 340/825.63; 340/825.08; 340/825.54; 340/825.36
[58] Field of Search ...................... 340/825.63, 825.44, 340/825.54, 825.36, 825.08, 870.04, 870.18, 870.24; 370/92

[56] References Cited

U.S. PATENT DOCUMENTS

| | | | |
|---|---|---|---|
| 4,298,978 | 11/1981 | Nakamura | 370/92 |
| 4,394,655 | 7/1983 | Wynne et al. | 340/825.36 |
| 4,470,047 | 9/1984 | Vogt et al. | 340/825.54 |
| 4,477,800 | 10/1984 | O'Brien | 340/825.08 |
| 4,507,652 | 3/1985 | Vogt et al. | 340/825.36 |

Primary Examiner—Donald J. Yusko
Attorney, Agent, or Firm—James J. Jennings

[57] ABSTRACT

A communications system includes a transmitter for sending successive composite signals, each of which has successive segments which represent different data. A composite signal can be a pulse group with the segments denoted by individual pulses. A plurality of receivers are connected to receive the successive composite signals and recognize the data in each signal. Part of the transmitted composite signal is encoded by modifying at least one segment of a given composite signal in a predetermined manner. When an addressed receiver detects the encoded data or key in the composite signal, the receiver assigns a different significance to data in the remainder of that composite signal, and/or in at least one other composite signal. If the key is present in the next successive transmission, yet another significance is assigned to the data.

19 Claims, 18 Drawing Figures

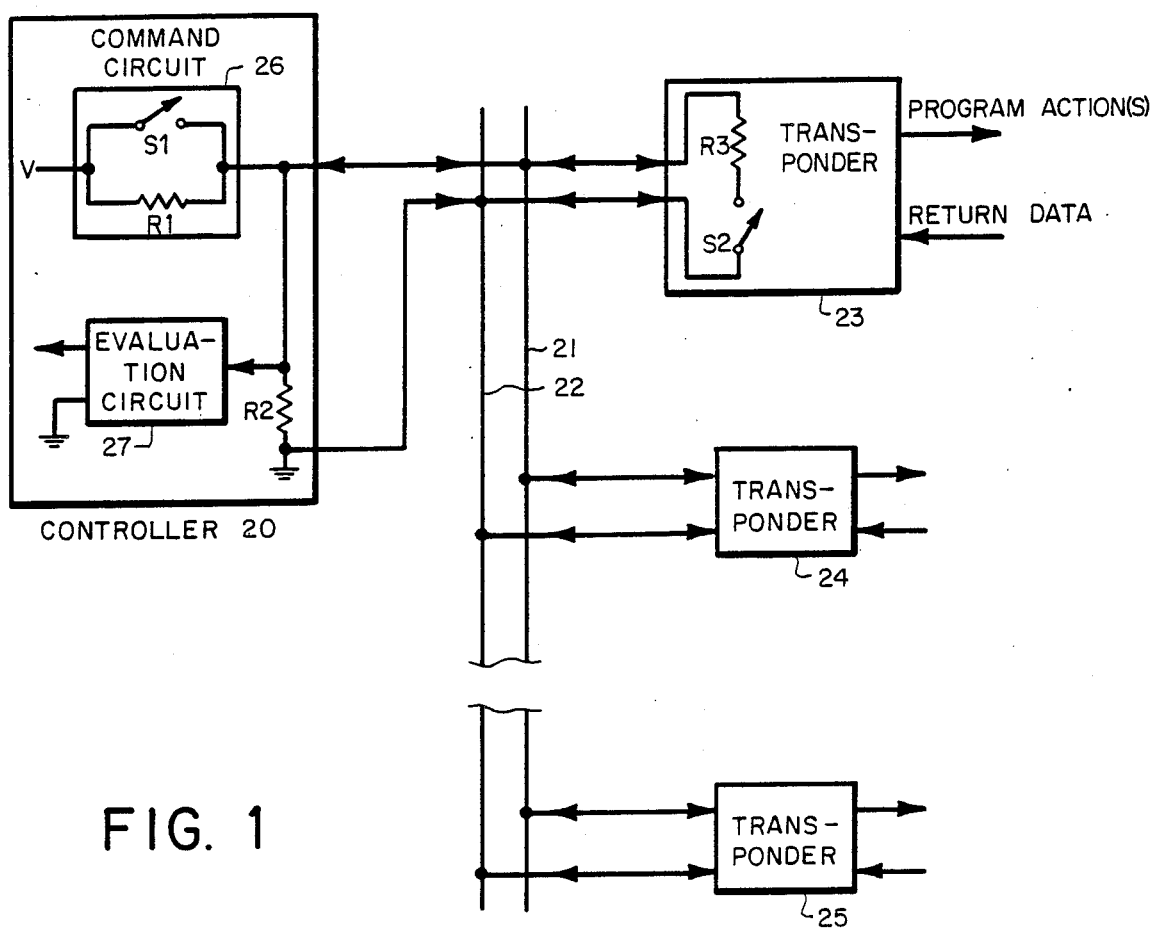
FIG. 1
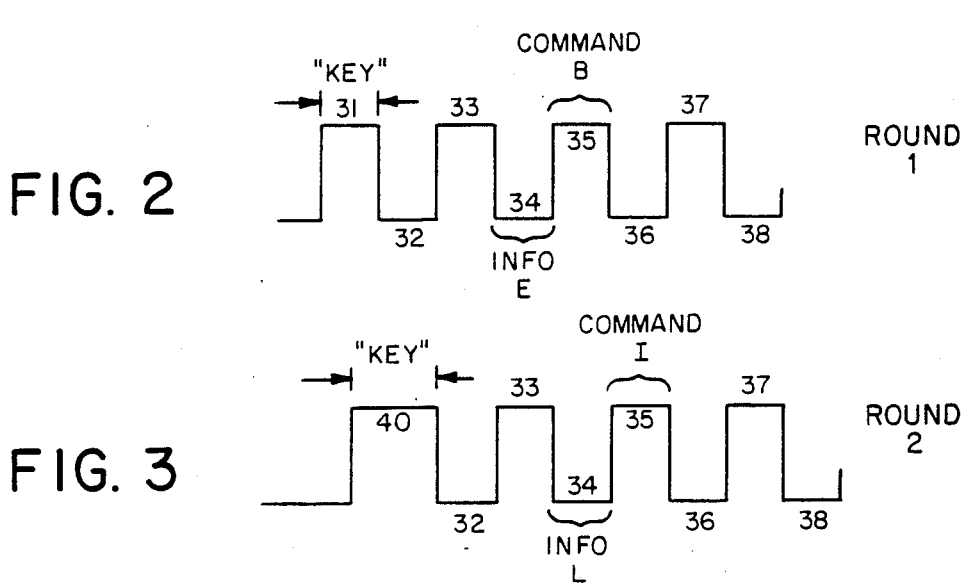
FIG. 2
FIG. 3

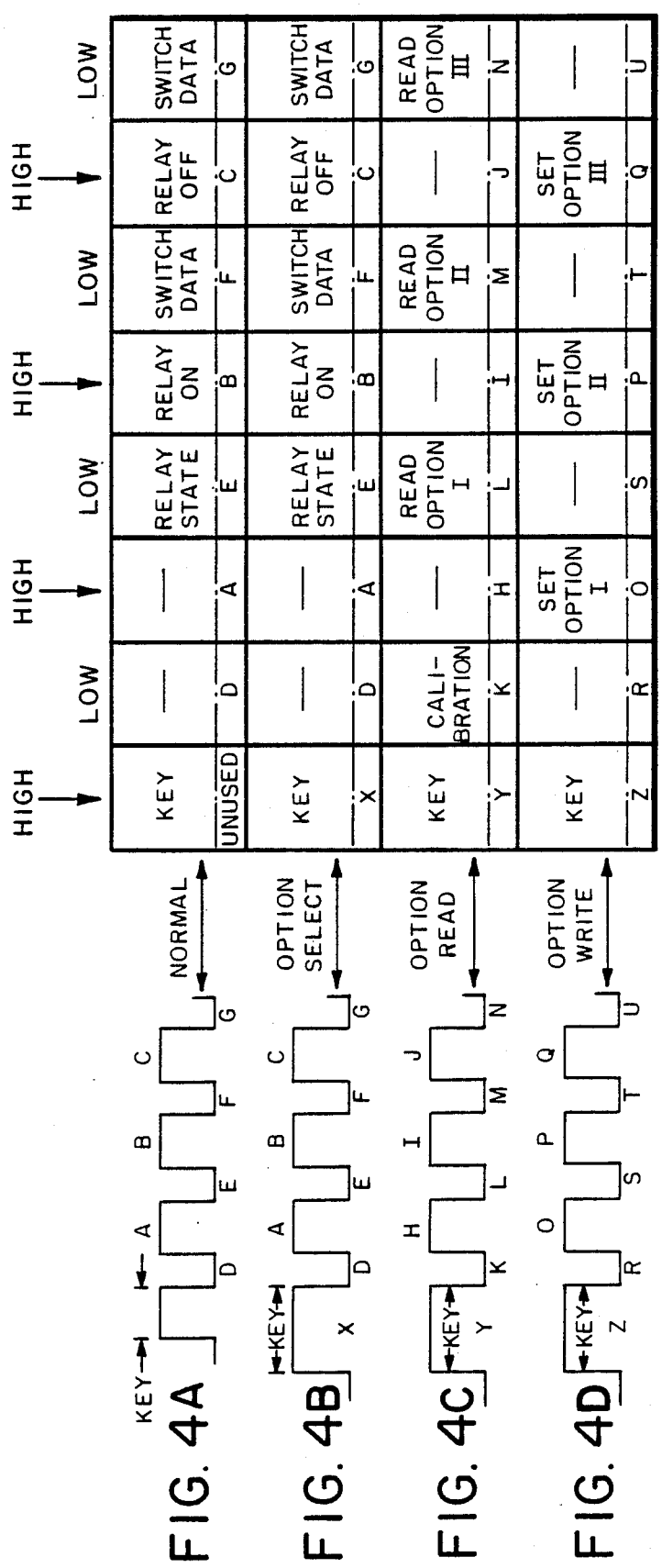

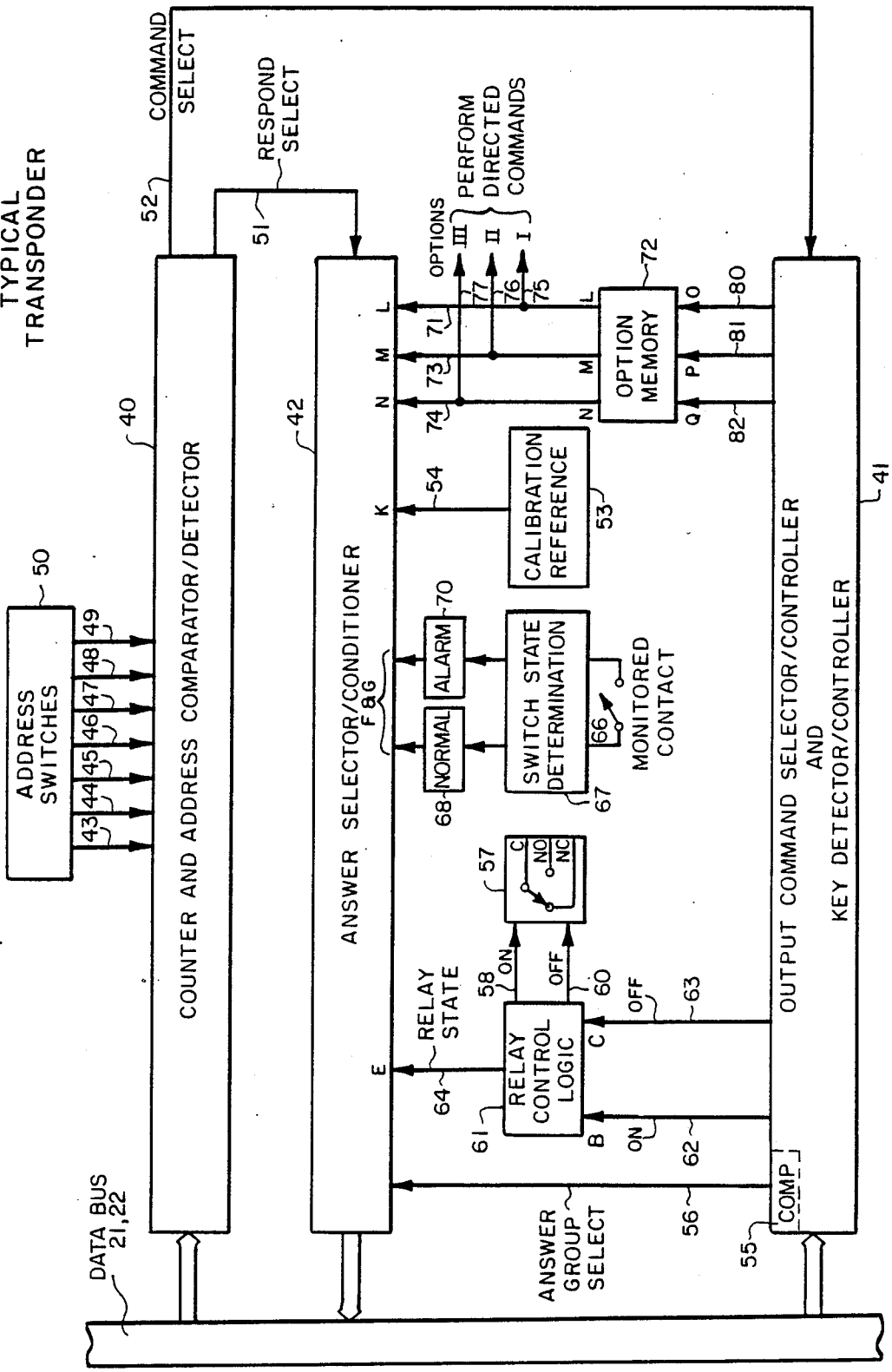

4,658,249

DATA COMMUNICATION SYSTEM WITH KEY DATA BIT DENOTING SIGNIFICANCE OF OTHER DATA BITS

BACKGROUND OF THE INVENTION

The present invention is directed to a data communications system and is useful with systems employing groups of pulses directed to various receivers. The pulses in a particular group can represent different information to the same receiver. In more detail the present invention includes such a system in which one or more of the transmitted pulses functions as a "key", and this key is utilized by the specific receiver to determine the significance—in the qualitative sense, identifying the nature of the data represented—of other data pulses in the same group, or of pulses in other groups.

Different systems for transmitting data in a series of pulses groups are known and used. Examples of such systems are depicted and explained in U.S. Pat. No. 4,394,655, entitled "Bidirectional, Interactive Fire Detection System" which issued July 19, 1983; U.S. Pat. No. 4,470,047, with the same title, which issued Sept. 4, 1984, and U.S. Pat. No. 4,507,652, with the same title, which issued Mar. 26, 1985. The teachings of these patents are incorporated herein by reference. In these patents a controller (transmitter) communicates with one or more transponders (receivers) over a two-wire system. Communication could also be over any other form of data bus. In those patents the communication is by data bursts or groups of pulses, as represented generally in FIGS. 5 and 6 of the '655 patent, and in FIGS. 4 and 5 of the other two references. In these systems the high-amplitude portions of a data pulse group were used to transmit commands from the controller, and the low-amplitude portions were used to return information from the addressed transponder to the controller. Such an arrangement has proved very effective in systems employed in the life safety and property protection fields. In these earlier patents four different bits of information could be returned in a single data pulse group. Increasing complexity of data communication systems and more widespread use of such arrangements has identified a need for returning more data than is possible with the described system, without significantly affecting the cost or complexity of the enhanced operating system, or the time required to send and/or receive all the desired data.

It is therefore a primary consideration of the present invention to provide an improved data communication system in which data is transmitted as different bits in a group of data bits, or pulse group, but in which the number of different data types which can be transmitted in a single pulse group substantially exceeds the number of data bits in a single group.

SUMMARY OF THE INVENTION

A communications system constructed in accordance with the present invention includes a transmitter for sending successive composite signals in successive polls, where each composite signal has successive segments or pulses which represent different data. The system includes one or more receivers operable to receive the successive polls of composite signals and to recognize the different data in each composite signal. The receiver includes memory means for storing information denoting the status of at least one segment of a composite signal.

Particularly in accordance with the present invention, the transmitter includes means for modifying at least one segment of a given composite signal in a predetermined manner within a given poll. At least one receiver in the system operates, when such a modified composite signal, with a modified segment in a poll immediately following a poll with no modification of any signal segment, is received, to assign a different significance to the data in at least one other segment of that modified composite signal, and/or in a different one of the received composite signals.

Such a system finds particular utility in, but is not limited to, communication systems of the type described in the above-identified patents. By way of example, the data pulses in a single composite signal or data group normally have the same significance at the transponder and in the controller. The controller can easily modify one (or more) pulses, for example, by extending the time duration of the high amplitude of the first pulse, in effect "telling" the transponder to send back different data in the low portions of that same pulse group, or in a different pulse group. Alternately the key pulse modified by the controller could notify the transponder that the significance of a pulse is changed in that pulse group, or in a different group. In this way the number of commands available and the different types of data which can be returned from a single transponder are not limited by the number of pulses or segments in a composite signal.

THE DRAWINGS

In the several figures of the drawings, like reference numerals identify like components, and in those drawings:

FIG. 1 is a block diagram of a data communication system constructed in accordance with the present invention;

FIG. 2 is a graphical illustration of a composite signal for representing data as taught in the prior art;

FIG. 3 is a graphical illustration useful, with FIG. 2, to understand the operation of the present invention;

FIGS. 4A–4D and 6 are graphical illustrations, and FIG. 5 is an operations table, which together help to understand the operation of one embodiment of the present invention;

FIG. 7 is a block diagram of a transponder particularly useful for implementing the present invention.

GENERAL SYSTEM DESCRIPTION

Figure 6:
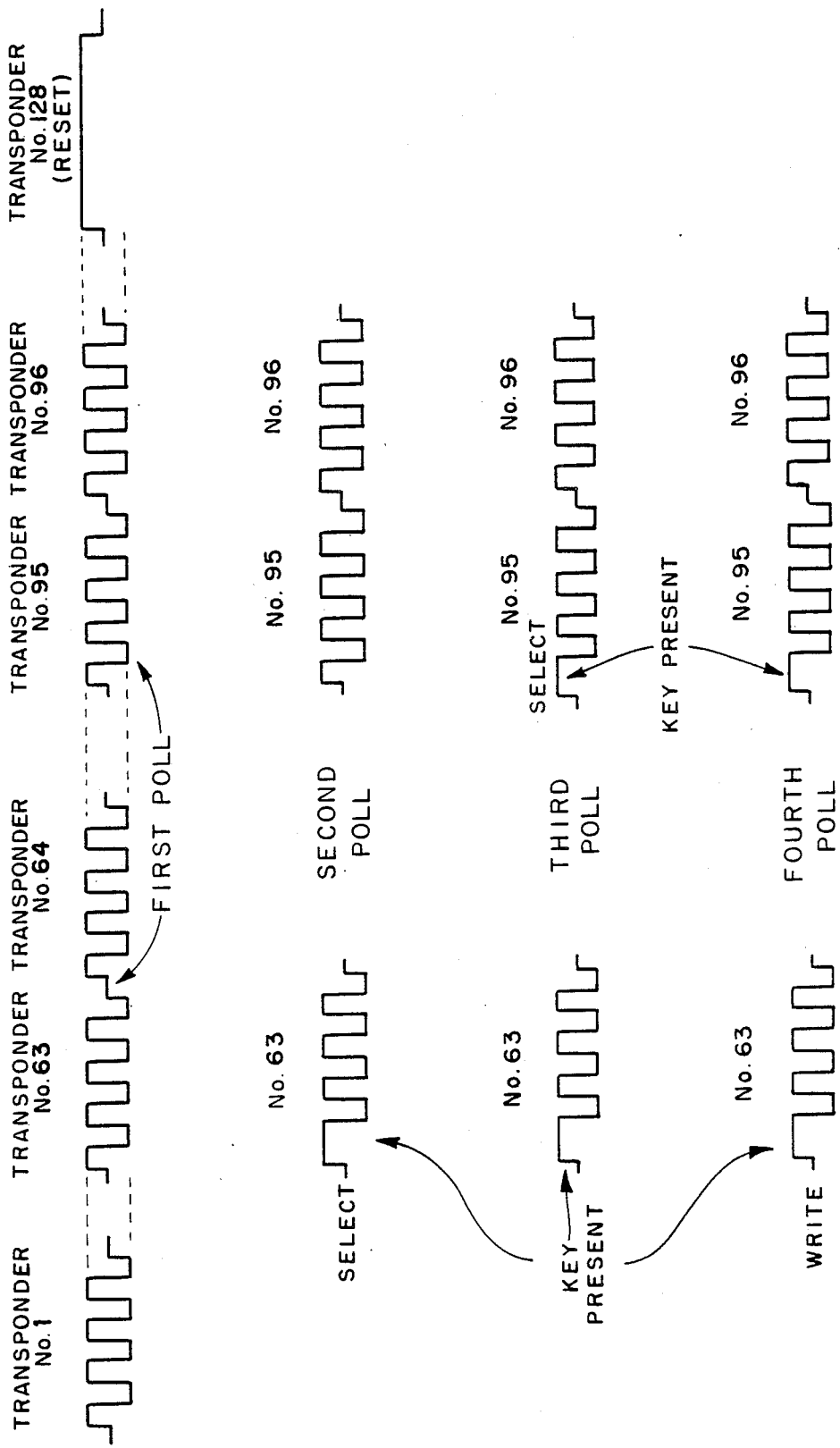

FIG. 1 depicts a general arrangement for data communications in which a controller 20 sends and receives data over a pair of conductors 21, 22, to which a plurality of transponders 23, 24 and 25 are coupled. Only three transponders are shown but it will become apparent that large numbers of transponders can communicate over the same conductor pair with controller 20. Controller 20 includes a command circuit 26 having a switch S1 coupled in parallel with a resistor R1. One side of this parallel combination is coupled to a reference voltage V, and the other side is coupled both to conductor 21 and to an input of evaluation circuit 27. Another resistor R2 is coupled between the input to circuit 27 and a plane of reference potential, to which conductor 22 is also coupled. As shown in transponder 23, typically each transponder includes a resistor R3 coupled in series with a switch S2, and this combination is coupled to conductors 21, 22 as shown. When switch S1 in the controller is closed, a voltage V is applied over conductors 21, 22 to the various transponders. When switch S1 is opened, and all the switches S2 remain open, the voltage divider circuit including resistors R1 and R2 provides a voltage of V/2 at the input to evaluation circuit 27. All the resistors R1, R2 and R3 are of equal value. Thus with a voltage of V/2 on the line, and when S2 is then closed, R3 is placed in parallel with R2, and a voltage V/3 appears at the input of evaluation circuit 27. Accordingly closure of switch S1 can be used to send commands to the respective transponders, which then perform the commanded action. Additionally each transponder can return data from itself and/or from associated equipment, such as a combustion detector or unauthorized entry sensor, by closure of switch S2 when switch S1 is open. A detailed explanation of such system operation is set out in the three references identified above.

Sequential closing and opening of switches S1 and S2 can produce a successive composite signal, each of which includes successive segments as shown in FIG. 2. These different segments include the high amplitude portions 31, 33, 35, 37, and the low amplitude portions 32, 34, 36 and 38. In the referenced patents the high-amplitude portions were utilized to transmit commands to the different transponders, and the low-amplitude portions were employed to return data from a selected transponder to the controller. The significance (for example, "turn on light", "reset relay", and so forth) of the data bit or pulse width was always the same in the described system, whereas the variation in duration of a specific high or low amplitude portion of the composite signal signified the value or quantity of the particular data. Thus with four pulse highs the system was limited to four commands, and likewise only four types of data could be returned in the four pulse lows.

Particularly in accordance with the present invention, the number of data types which can be returned in a single composite signal or pulse group is substantially expanded by assigning one or more signal segments as a "key" which, when received in the transponder, effectively "unlocks" or assigns the significance of the other data segments in the same or successive composite data signals. As shown in FIG. 3, the first pulse high portion 40 is stretched or elongated in time as compared to the first pulse high in FIG. 2. The transponder includes means operative, responsive to detection of the key pulse(s), to assign different significance to the other pulses in that same group, or in one or more later received groups. For example the third pulse high 35 which denotes command B in FIG. 2 no longer has the same significance in the pulse signal of FIG. 3. As shown, while pulse 35 is electrically identical to the pulse 35 in FIG. 2, because key pulse 40 changed the significance of the data in the second round of polling, pulse 35 represents a command I in FIG. 3. Likewise the information returned from the addressed transponder in the second low represents information L in FIG. 3, whereas in the first round of polling the information connoted by the electrically identical pulse was information E.

Those skilled in the art will appreciate that a more complex key could be employed. For example the elongation of the first pulse could signify to the transponder that the actual key will be found in another segment of the composite signal. Similarly receipt of the key pulse could also indicate that the change in the data significance of earlier-received data should be made. This can be accomplished by storing the data in an array as it is received, and assigning the significance of the data only after the key is received. For ease of explanation the key will be assumed to be transmitted in the first high segment of the composite signal, and likewise the change in data significance will be in that composite signal and/or successive signals.

DETAILED DESCRIPTION OF THE INVENTION

FIGS. 4A, 4B, 4C and 4D, taken with the tabulation of FIG. 5, depict one way of utilizing the key in one or more pulses of a system to expand the information content in the remaining number of bits in a pulse group. While the inventive concept is explained as implemented in connection with a bidirectional, interactive system of the type taught and claimed in the three patents noted above, the applicability of the key data bit to the expansion of the data content in a composite group will be readily understood and appreciated by those skilled in this art.

FIG. 4A depicts a composite signal with successive data segments representing different data, and is similar to the pulse group shown in FIG. 2. The first high level portion in FIG. 4A, and in each of the succeeding pulse groups, will be termed the key segment, as it denotes whether the polling action is a normal poll, with a normal pulse group, or whether some other significance is to be assigned to the other data bits, either in the same or in a subsequent poll. FIG. 4B is generally similar to FIG. 4A except that the key pulse has its duration extended as shown. In the illustrated embodiment, the poll which produces the extended key pulse will be termed the option select poll. To facilitate comparison of successive polls and the respective composite pulse groups, the letters of the alphabet A–Z have been used to denote the high and low level portions of the various pulses in a composite signal. In FIG. 4B the key pulse "tells" the addressed transponder that, while the remainder of the data bits signify the same information as in the preceding poll, the next subsequent poll—providing the key pulse is again extended to confirm the operation—will produce a different data assignment for the individual data segments. The extended key pulse in FIG. 4B is designated X, and no designation is given to the key pulse in FIG. 4A because in the illustrated embodiment no command has been associated with the key pulse in the normal poll.

As will be seen from the upper two rows in FIG. 5, the significance of the various high and low pulse portions remains the same in both the normal and the option select modes. Thus to read certain data stored in memory in the transponder, it is necessary in this preferred embodiment to confirm that a read of the data is actually desired by providing another successive poll, with the key pulse again extended as shown in FIG. 4C. In this case the key pulse duration is designated Y, and different letter assignments H–N have been given to the command and data return data segments in the remainder of this composite signal. From the third horizontal row in FIG. 5, it is seen that with the exception of the extended key at the beginning of this composite group, the other high portions H, I and J are not used to transmit command information in this poll. Instead various options can be read and these are designated L, M and N. In addition a calibration pulse can be returned, as designed by letter K, to let the controller know that some reference condition at the transponder is within or without preset standard limits. Such a calibration pulse has been fully explained in the above identified patents.

In the event it is desired to change the data stored in a given transponder array, in the next successive poll the key pulse is again extended, as shown in FIG. 4D. This again changes the significance of the high level and low level portions of the various pulse segments in the pulse group. In this write poll, the low level portions R, S, T and U are not used, but the high level portions O, P and Q are used to send certain commands to the replying transponder. Of course if the first pulse in FIG. 4D had not been extended, but was the same duration as the key pulse in FIG. 4A, the write mode would not be entered and the system would return to normal polling.

In cerain equipment it is desired to periodically read information stored in an array, and to receive data such as a calibration pulse. This can be accomplished simply by extending the key pulse in two successive polls to enter the option read mode. The described system has particular utility in a system where a volatile memory is employed, and the information stored in the memory is lost every time there is a power failure or the system is shut down. When this occurs there is a non-volatile memory in the controller with the desired information for transmission to the individual transponders to control the respective operations of that equipment. Accordingly there is a small program in the controller to regulate the system operations during the first eight polls after power is turned off or lost, and then restored. The first poll is a normal poll, and the key has been extended in the second poll to enter the option select mode. The key is again extended in the third poll to enter the option read mode, but the data has been lost and this operation is not effective to read significant data at this time. However it is necessary to go through the option read poll to enter the fourth poll, with the key again extended, and then write or store the data in the appropriate array within the addressed transponders. Next the fifth poll is again a normal poll, and the sixth and seventh polls have the first pulse high extended to go through the option select mode and reach the option read mode. Thus in this seventh poll, with the system in the read condition, the data previously stored in the respective transponder arrays is read back to the controller and compared with the stored reference data to be certain that the proper data was in fact written during the fourth poll. Upon confirmation that such data was in fact produced at the appropriate locations, the system in the eighth polls goes to the normal operation, and remains in normal operation until there is either a power failure and restart, or a command issued from the controller to obtain selective information from a given one of the transponders.

It is again emphasized that the key bit must be present in successive polls to go from the normal poll to the option select, then to the option read, and then to the option write poll. A "successive poll", as used herein and in the appended claims, means not just later in time but the poll immediately following the previous poll. That is, between the select and read conditions represented in FIGS. 4B and 4C, there is no intervening poll. With this understanding of successive polls, another description of the polling operation will be given in connection with FIG. 6.

In the preferred embodiment the communication system used a composite signal of the type described in the above-identified patents, with each composite signal including four pulses shown in FIG. 6. The pulses addressed to different transponders in a single round of polling are shown across one line. In the first poll, the pulses transmitted to successive addresses or transponders 1, 63, 64, 95, 96 and 128 are shown. The extended high at transponder address 128 is used as a reset pulse as explained in the referenced patents. In each of the other composite signals, the first high—which is also the key in this embodiment—is not stretched. In the second poll, the key is present at address 63, and thus this transponder recognizes that if the key is again present in the next successive poll, the option read mode will be employed. The key is not present at address 95 or 96 in the second poll.

In the next successive round of polling, the third poll, the key is again present at address 63, which is thus in the option read mode, and the key is also present at address 95, so that this transponder enters the option select mode. At address 86 the key is not present.

In the next successive poll, the fourth poll in the illustration, the key is again present at transponder 63. Hence this transponder is in the write mode during this poll. Transponder 95 recognizes that the key is again present, and hence this transponder is in the option read mode. At address 96 the key is still not present, and this transponder remains in the normal operating mode.

Thus in these four successive polls, transponder 63 went through the option select and option read modes to enter the write mode. Transponder 95 went to the option select mode at the third poll, and the option read mode in the fourth poll. Transponder 96 never received a key bit and thus remained in the normal mode. Those skilled in the art will appreciate that additional modes can be added to the system by requiring the presence of the key bit in additional successive polls.

FIG. 7 depicts the general layout of one transponder suitable for use in the system of the invention. Data bus 21, 22 can be a pair of conductors as described above in connection with FIG. 1, a coaxial cable, or any other suitable passge for electrical signals. It is also understood that the transponders need not be physically connected, as by a solid, low-resistance electrical connection, but there can be intermediate transmission through the air or other medium without departing from the data transmission and recognition concept of the present invention.

Data received over bus 21, 22 is passed into counter and address comparator/detector 40, and into output command selector/controller and key detector/controller 41. When data is to be returned to the controller, answer selector/conditioner 42 develops the appropriate signal for transmission over the data bus to the controller. Composite signals appearing on the bus are received in circuit 40, where the composite signals are continually counted to determine the address of the transponder being signalled from the controller. A plurality of address switches 50 are preset in a certain code to identify the particular transponder in which the switches are physically positioned. Output conductors 43-49 thus indicate the state (open or closed) of seven switches (not shown) within address switch circuit 50 and circuit 40 continually compares this address with the address denoted by the incoming pulses from bus 21, 22. With seven switches a total of 128 addresses can be preset, but of course other numbers of switches can be utilized depending upon the number of transponders to be coupled in a single system. When the circuit 40 recognizes that the address on the bus is that of this specific transponder, the output circuit provides a respond select signal over line 51 to the answer selector/conditioner circuit 42 when highs are present and provides a command select signal over line 52 to circuit 41 when the lows are present. The signals on lines 51 and 52 are thus enabling signals, to effectively enable the associated circuits 41, 42 to accomplish the commands sent and/or return the data requested in the composite signal during the time that this specific transponder's address is valid.

A calibration reference circuit 53 is coupled over line 54 to circuit 42. When the key pulse has been stretched for two consecutive polls, the calibration signal designated K in FIGS. 4C and 5 is passed through circuit 42, and over the data bus to the controller. This is only done when circuit 41 recognizes that the first pulse in a composite signal has been stretched to indicate that, if the same pulse is again elongated in the next successive poll, the option read mode has been entered. Presence of the stretched first pulse, or key detection, is accomplished by comparator 55 in circuit 41. When this occurs a control signal—an "answer group select" signal, as will be explained—is passed from circuit 41 over line 56 to circuit 42, to effectively gate the calibration signal back to the controller on the first low in the read cycle. Of course circuit 41 also determines when the key is not present, that is, when the initial pulse is not modified, and then normal operation of the system continues.

In normal operation, as shown by the first block in the uppermost row of FIG. 5, the key or first pulse does not signify any command. The first low, designated D, and the second high, A, likewise are not used in this illustration. The second low segment in FIG. 4A is designated E, and this pulse is that used to instruct the transponder to return information concerning the status of an associated relay, designated 57 in FIG. 7. As there shown the relay is a latching relay having common, normally open, and normally closed connections. The relay is connected to receive a turn-on signal over line 58, and a turn-off signal over line 60, from an associated relay control logic circuit 61. This logic circuit in its turn receives a turn-on signal over line 62, and a turn-off signal over line 63, from output command circuit 41. The status of the last command signal—turn-on or turn-off—is stored in logic circuit 61, and continually presented over line 64 to circuit 42. Thus when the information designated E is to be returned, this is accomplished in the same manner as information is returned on the other lows.

In FIG. 4A, the third and fourth highs are designated B and C, commands to turn relay 57 on and off. The operation of this arrangement has just been described in connection with the relay state signal, designated E.

In FIG. 4A the third and fourth lows are designated F and G, and these portions of a composite data group are utilized to return information concerning the state of some switch associated with the transponder. In FIG. 7, a switch 66 is shown and it is the status of these switch contacts which are monitored by switch state determination circuit 67. Switch 66 can be internal to the transponder or external, such as a switch contact set positioned adjacent a door or window, which contact set is separated upon movement of one part relative to another. Alternatively the switch can represent a detector for particles of combustion, or some other unit which provides an analog signal which is modified in switch state determination circuit 76 so that its effective status is presented in the output latches 68 and 70.

All the circuit functions and operations in both the normal poll, and the first or option select poll, have now been described. Except for stretching the key pulse X in FIG. 4B, the commands transmitted in the high amplitude portions and information returned in the low level portions are exactly the same, as shown in the first two rows of FIG. 5. If comparator 55 indicates the next successive poll also has the key pulse elongated, as referenced by Y in FIG. 4C, then the significance of the data in the high and low portions is changed as shown in the third row of FIG. 5.

Upon receipt of the second consecutive stretched key pulse, designated Y, the output of comparator 55 provides the answer group select signal on line 56 to indicate which data is to be returned over circuit 42 and bus 21, 22 to the controller. On the first low pulse, K, the calibration reference is passed from circuit 53, over line 54 and circuit 42 to the data bus. The second, third and fourth highs, H, I and J, are not used in the read option of this system in the described embodiment. The second low, designated L, is effective to read the status of option I on line 71 at the output side of option memory circuit 72. This output is not employed in the system illustrated. The third low, designated M, is used to read option II, which appears on line 73 at the output side of option memory 72. The fourth low, designated N, is used to read option III on line 74 at the output side of option memory 72. The option commands I, II and III are passed over conductors 75, 76 and 77 to actuate associated equipment (not shown) or perform any directed commands.

In the next successive poll, the option write poll, if the key pulse is again stretched as designated by Z, the appropriate answer group select signal appears on line 56, and the significance of the data bits is again changed. The data return low amplitude portions R, S, T and U are not used in the option write mode in this embodiment. The second high, designated O, sets option I. This means a signal is passed from circuit 41 over line 80 to option memory circuit 72, to effectively set option I and provide a signal on lines 71 and 75. The third high, P, provides a set option II signal over line 81 to the option memory circuit 72. Option II controls the signal on lines 73 and 76. The fourth high portion, Q, effectively provides a signal over line 82 to set the third option in option memory circuit 72, controlling the output on lines 74 and 77. Thus the data stored in option memory circuit 72 is initially inserted, and can be modified, by providing signals over lines 80, 81 and 82. To do this the poll must go through three successive rounds of polling with the first pulse extended, that is, with whatever key is used present, to pass from the option select mode through the option read mode to the write mode. If the initial key pulse is only stretched for two successive rounds, the option write mode is not attained, and the data stored in the memory is not altered. However, because it is presented at the output conductors 71, 73 and 74, it can be and is read over circuit 42 back to the controller.

Though the logic shown in FIG. 7 has been implemented in a single integrated circuit, those skilled in the art will appreciate that the logic could be performed by a microprocessor and appropriate program, or by another form of discrete logic.

Figure 8A:
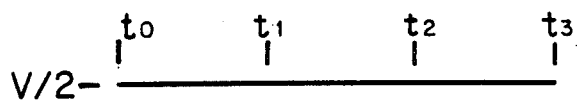
FIGS. 8A–8H are graphical illustrations useful in understanding operation of the inventive system.
Figure 8B:
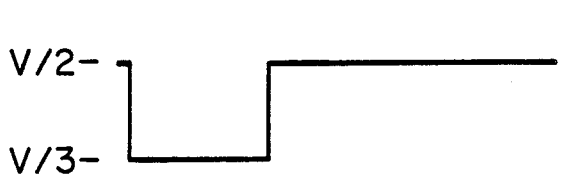
Figure 8C:
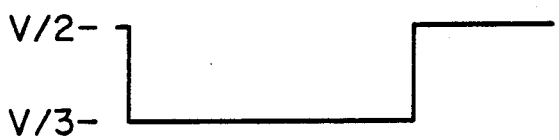
Figure 8D:

FIGS. 8A–8H depict eight different waveforms for returning information on the pulse lows in the system. As shown in FIGS. 8A–8H, eight different response signals are possible with a psuedo-binary system in which the signal interval is divided into three portions, starting at t0. The first portion ends at time t1, the second at time t2, and the third at time t3. FIG. 8A illustrates a data return signal in which a response is provided from a transponder by keeping its switch S2 open, and the voltage high at V/2, for the entire time period. The second response signal in FIG. 8B goes low (S2 closed) for the first portion and remains high for the second and third portions. The response signal in FIG. 8C goes low for the first two portions then goes high and remains high for the third portion. FIG. 8D shows a response signal which goes low and remains low throughout the response interval. One or more of the binary states may be applied to any type of response signal.

Figure 8E:
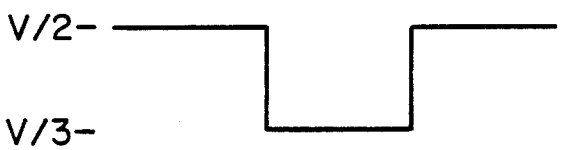
Figure 8F:
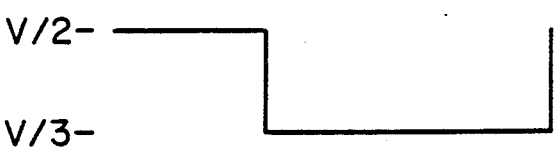
Figure 8G:
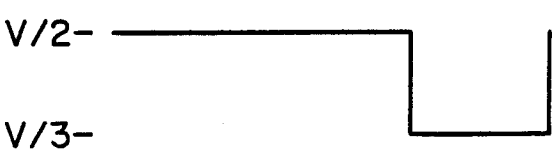
Figure 8H:

FIG. 8E shows a response signal which remains high for the first portion, is low for the second portion, and is again high for the third portion. In FIG. 8F the first portion is high and the second and third are low. The response is high for the first two portions of FIG. 8G and then goes low for the third portion of that pulse. FIG. 8H shows a response signal which remains low at V/3 (S2 closed) for the first portion, goes high at t1 and remains high for the second portion, and then goes low and remains low for the third portion.

TECHNICAL ADVANTAGES

With the system of the invention of a data transmission system employing groups of pulses can provide a number of data types substantially greater than the number of pulses in a given group. This is accomplished by assigning one or more bits in a composite signal as a key, which key is detected at each receiver or transponder and utilized to assign the appropriate significance to other data pulses in that group, or to pulses in successive groups. Error can be minimized by repeating a transmission with the same key again present to enter a specific program mode, with a second immediately successive repetition for the equipment to read data or assign different significance to the other signal bits. By again repeating the poll—the next successive poll—with the key present, a different significance is attached to the data bits, and in the described embodiment this deepest poll is employed as a write option. Manifestly any desired number of successive polls can be used, with an appropriate key for each successive poll, to continually change the significance of the data bits.

It is important to note that, while the system of the invention has particular utility with bidirectional, interactive data communication system of the type taught in the patents noted above and incorporated herein by reference, the principles of the invention are applicable to a broad spectrum of data communication systems.

In the appended claims the term "connected" means a d-c connection between two components with virtually zero d-c resistance between those components. The term "coupled" indicates there is a functional relationship between two components, with the possible interposition of other elements including air, between the two components described as "coupled" or "intercoupled".

While only a particular embodiment of the invention has been described and claimed herein, it is apparent that various modifications and alterations of the invention may be made. It is therefore the intention in the appended claims to cover all such modifications and alternations as may fall within the true spirit and scope of the invention.

What is claimed is:

1. A communication system comprising a transmitter for sending composite signals in successive polls, each composite signal having successive segments which represent different data, and a receiver operable to receive the successive polls of composite signals and to recognize the different data in a composite signal, which receiver includes memory means for storing information denoting the status of at least one segment of a composite signal, characterized in that said transmitter includes means for modifying at least one segment of a given composite signal in a predetermined manner within a given poll, and said receiver is operable, upon receipt of said given composite signal with a modified segment in a poll immediately following a poll with no modification of any signal segment, to assign a different significance to data in the remainder of said given composite signal and/or in at least one other received composite signal.

2. A communication system as claimed in claim 1, in which a composite signal includes pulses as said different segments, and a composite signal segment is modified by changing a characteristic of at least one of said pulses.

3. A communication system as claimed in claim 2, in which the pulse characteristic changed is the pulse duration.

4. A communication system as claimed in claim 1, in which the modified signal segment, or segments, functions as a key, and the receiver includes means for detecting presence and absence of the key.

5. A communication system as claimed in claim 1, in which the transmitter sends the composite signals in successive polls, and the receiver operates, after the significance of the data has been changed at least once, to again change the significance of the data when a modified signal segment is received in the next successive poll.

6. A communication system comprising a controller for sending composite signals in successive polls, each composite signal having successive segments which represent different data and further including address information, and a plurality of transponders connected to receive the successive polls of composite signals and to recognize both the individual transponder address and the different data in a composite signal, which transponders include memory means for storing information denoting the status of at least one segment of a composite signal, characterized in that said controller includes means for modifying at least one segment of a given composite signal within a given poll in a predetermined manner without changing the address information, and at least one transponder is operable, upon recognition of its address and receipt of said given composite signal with a modified segment in a poll immediately following a poll with no modification of any signal segment, to assign a different significance to data in the remainder of said given composite signal and/or in at least one other received composite signal.

7. A communication system as claimed in claim 6, in which a composite signal includes pulses as said different segments, and a composite signal segment is modified by changing a characteristic of at least one of said pulses.

8. A communication system as claimed in claim 7, in which the pulse characteristic changed is the pulse duration.

9. A communication system as claimed in claim 6, in which the modified signal segment, or segments, functions as a key, and the addressed transponder includes means for detecting presence and absence of the key.

10. A communication system as claimed in claim 9, in which the addressed transponder includes means for returning data to the controller, and the addressed transponder is operable, upon recognition of its address and detection of key presence, to assign a different significance to data returned to the controller.

11. A communication system as claimed in claim 6, in which the controller sends the composite signals in successive polls, and the addressed transponder operates, after the significance of the data has been changed at least once, to again change the significance of the data when a modified signal segment is received in the next successive poll.

12. A bidirectional, interactive communication system comprising a controller for sending composite signals in successive polls, each composite signal having successive bits which represent different data, and a plurality of transponders operable to receive the successive polls of composite signals and to both recognize the different data in a composite signal and to derive individual address information from the composite signals, which transponders include memory means for storing information denoting the status of at least one segment of a composite signal, characterized in that said controller includes means for modifying at least one preassigned segment of a given composite signal within a given poll in a predetermined manner without modifying the address information, and at least one of said transponders is operable, upon recognition of its address and receipt of said given composite signal with a modified preassigned segment in a poll immediately following a poll with no modification of said preassigned segment, to assign a different significance to data in the remainder of said given composite signal and/or in at least one other received composite signal.

13. A bidirectional, interactive communication system as claimed in claim 12, in which a composite signal includes pulses to represent said different data bits, and a composite signal segment is modified by changing a characteristic of at least one of said pulses without altering said address information.

14. A bidirectional, interactive communication system as claimed in claim 13, in which the pulse characteristic changed is the pulse duration.

15. A bidirectional, interactive communication system as claimed in claim 12, in which the modified signal segment, or segments, functions as a key, and the addressed transponder includes means for detecting presence and absence of the key.

16. A bidirectional, interactive communication system as claimed in claim 15, in which the addressed transponder includes means for returning data to the controller, and the addressed transponder is operable, upon recognition of its address and detection of key presence, to assign a different significance to data returned to the controller.

17. A bidirectional, interactive communication system as claimed in claim 12, in which the addressed transponder operates, after the significance of the data has been changed at least once, to again change the significance of the data when a modified preassigned signal segment is received in the next successive poll.

18. A bidirectional, interactive communication system as claimed in claim 15, in which the addressed transponder operates, after the key presence is detected in a given poll, to make no change in the significance of the data in the given poll, and upon detection of key presence in the next successive poll, to change the significance of data returned from the transponder to the controller in that next successive poll.

19. A bidirectional, interactive communication system as claimed in claim 18, in which detection of key presence in the third successive poll causes data sent from the controller to be stored in the transponder.

* * * * *